J. G. CAMPAU.
YIELDABLE TIRE FILLING.
APPLICATION FILED DEC. 31, 1917.
1,272,619.
Patented July 16, 1918.
2 SHEETS—SHEET 1.
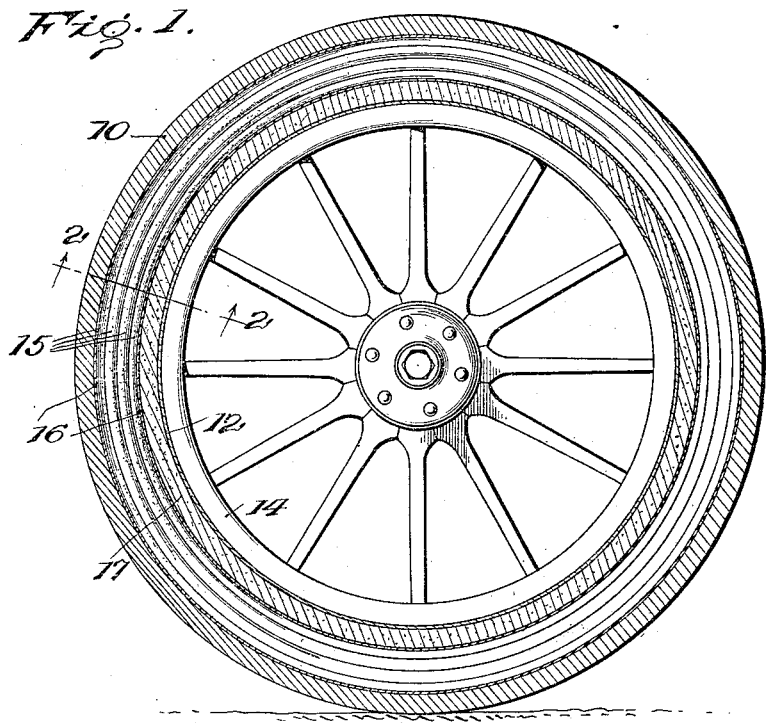
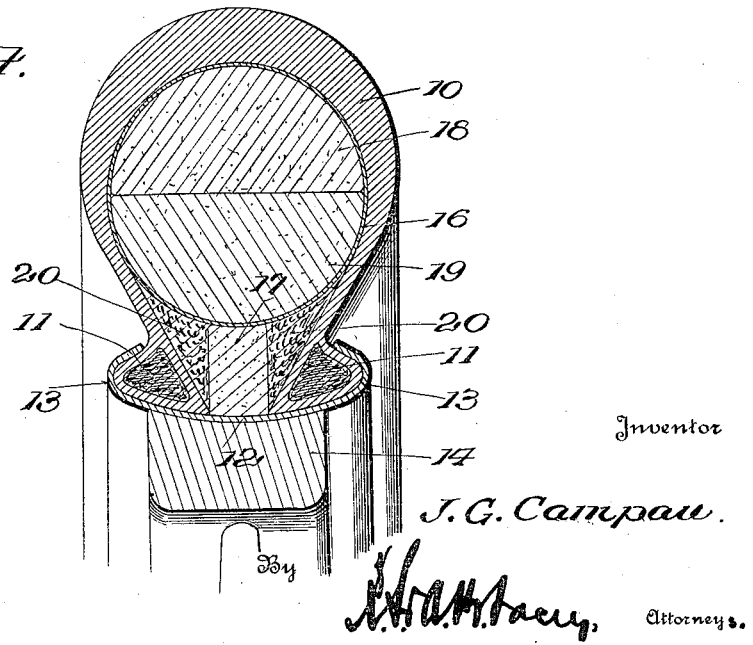
Inventor
J. G. Campau.
By
Attorneys.

J. G. CAMPAU.
YIELDABLE TIRE FILLING.
APPLICATION FILED DEC. 31, 1917.

1,272,619.

Patented July 16, 1918.
2 SHEETS—SHEET 2.

Inventor
J. G. Campau

By
Attorneys.

UNITED STATES PATENT OFFICE.

JULIAN G. CAMPAU, OF MONROE, MICHIGAN, ASSIGNOR OF ONE-FOURTH TO CHARLES C. GRODI, OF MONROE, MICHIGAN.

YIELDABLE TIRE-FILLING.

1,272,619.  Specification of Letters Patent.  Patented July 16, 1918.

Application filed December 31, 1917. Serial No. 209,779.

*To all whom it may concern:*

Be it known that I, JULIAN G. CAMPAU, a citizen of the United States, residing at Monroe, in the county of Monroe and State of Michigan, have invented certain new and useful Improvements in Yieldable Tire-Fillings, of which the following is a specification.

This invention relates to yieldable tires employed upon the wheels of automobiles, auto trucks, and similar vehicles, and has for one of its objects to provide a simply constructed tire which possesses all of the advantages of a yieldable pneumatic tire without danger of injury by puncture.

Another object of the invention is to produce a yieldable filling for a tire casing formed in a plurality of separable elements so that when a portion becomes impaired it may be renewed without discarding the remaining portions.

Another object of the invention is to provide a tire filling of a plurality of annular members of yieldable material grouped within the outer portion of a tire casing and supported by an annular rib disposed between the group of flexible units and the rim of the wheel.

With these and other objects in view, the invention consists in certain novel features of construction, as hereinafter shown and described and then specifically pointed out in the claim.

The improved device is designed more particularly for use in connection with tire casings usually employed in pneumatic tires and having beads adapted to be engaged by the clencher rims of an automobile or auto truck wheel rim, and for the purpose of illustration is shown applied to a tire casing of this character, and in the drawings:

Figure 1 is a side view of an automobile wheel with the improvement applied, the tire casing and wheel rim being in section.

Fig. 4 is a view similar to Fig. 2 illustrating a modification in the construction.

Figure 2:
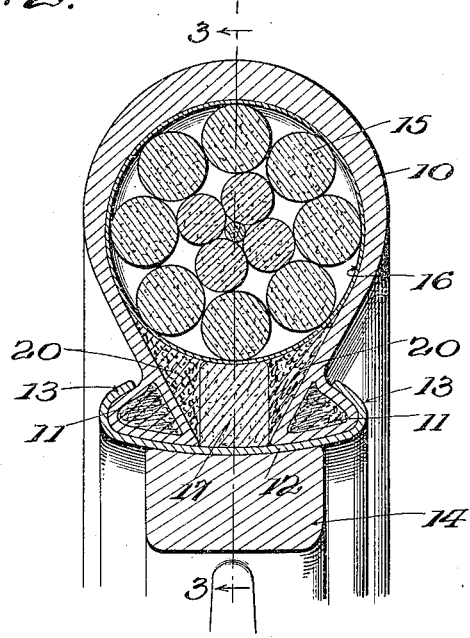
Fig. 2 is an enlarged transverse section on the line 2—2 of Fig. 1.
Figure 3:
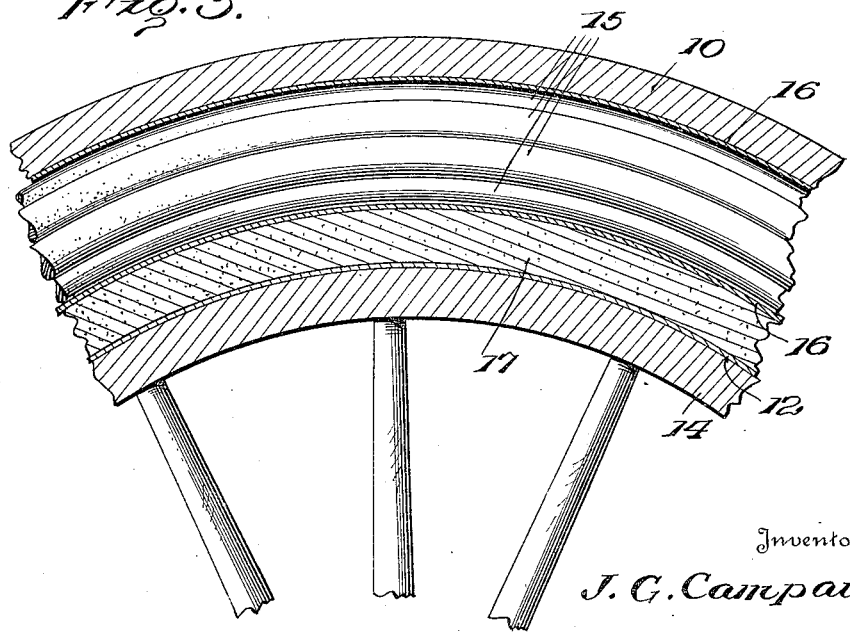
Fig. 3 is a longitudinal section of a portion of a tire on the line 3—3 of Fig. 2.

The tire casing 10 with its beads 11, the rim 12 with its flanges 13, and the felly 14 are of the usual construction.

Fitting within the casing 10 is an annular filler member formed of a plurality of units 15 of felt or like material, preferably circular transversely, and grouped in close relation and inclosed in an envelop or wrapping of fabric such as heavy canvas and indicated at 16.

When thus constructed the units 15 forming the annular member and the wrapping 16 are substantially circular in outline, and completely fill the outer portion of the casing and are spaced from the inner face of the rim 12.

Disposed within the casing 10 and bearing at one side upon the rim 12 and at the other side against the adjacent portion of the wrapping 16 of the annular filler member is an annular holding rib 17 of felt or like material which operates to initially maintain the annular filler member yieldably in its outer position.

The felt material is sufficiently yieldable to effectually absorb the concussions and jars incident to the operations of the vehicle, in substantially the same manner as the ordinary pneumatic tire but without danger of puncture or like injury.

The improved filling may be readily adapted without material structural change to tire casings of various forms and sizes and to tire casings of various construction of wheels.

The units 15 may be of any required size, or units of varying sizes may be employed in the same casing. In Fig. 4, the felt units are shown formed in two relatively large portions 18—19 semicircular in cross section, which form may be employed, if required.

The improved device is simple in construction, can be inexpensively manufactured and readily applied to the casing.

In event of the impairment of one or more of the units 15 the latter can be easily renewed without discarding the remaining units or other unimpaired portions.

If required the spaces defined by the members 10—16 and 17 may be supplied with a filler material as indicated at 20.

Having thus described the invention, what is claimed as new is:

A filler for a tire casing comprising an annular member formed of a plurality of units of yieldable material grouped around a common center and incased in an envelop, said annular member adapted to be disposed within the outer portion of a tire casing, and an annular holding rib of yieldable material engaging the annular member and adapted to bear against the rim of the wheel on which the tire casing is disposed.

In testimony whereof I affix my signature.

JULIAN G. CAMPAU. [L. S.]

Copies of this patent may be obtained for five cents each, by addressing the "Commissioner of Patents, Washington, D. C."